(12) United States Patent
Shigeta

(10) Patent No.: US 12,347,271 B2
(45) Date of Patent: *Jul. 1, 2025

(54) DEVICE FOR EXCHANGING GAMING CHIPS AND CASH CURRENCY

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 13 days.

This patent is subject to a terminal disclaimer.

(21) Appl. No.: 18/400,322

(22) Filed: Dec. 29, 2023

(65) Prior Publication Data

US 2024/0135781 A1 Apr. 25, 2024
US 2024/0233487 A9 Jul. 11, 2024

Related U.S. Application Data

(63) Continuation of application No. 17/253,865, filed as application No. PCT/JP2019/024051 on Jun. 18, 2019, now Pat. No. 11,928,929.

(30) Foreign Application Priority Data

Jun. 18, 2018 (JP) .................. 2018-128619

(51) Int. Cl.
*A63F 13/00* (2014.01)
*G06V 40/16* (2022.01)
(Continued)

(52) U.S. Cl.
CPC ........ *G07F 17/3248* (2013.01); *G06V 40/172* (2022.01); *G07D 11/225* (2019.01);
(Continued)

(58) Field of Classification Search
CPC ............... G07F 17/3244; G07F 17/322; G07F 17/3293; G07F 17/3248; G07F 17/3241
See application file for complete search history.

(56) References Cited

U.S. PATENT DOCUMENTS

| 5,735,742 A | 4/1998 | French |
| 2005/0012270 A1* | 1/2005 | Schubert .................. A63F 1/18 273/149 R |

(Continued)

FOREIGN PATENT DOCUMENTS

| EP | 3324374 A1 | 5/2018 |
| JP | 2689054 B2 | 12/1997 |

(Continued)

OTHER PUBLICATIONS

Extended European Search Report dated Nov. 28, 2024 issued in EP Application 24195452.8.

(Continued)

*Primary Examiner* — David L Lewis
*Assistant Examiner* — Eric M Thomas
(74) *Attorney, Agent, or Firm* — NORTON ROSE FULBRIGHT US LLP

(57) ABSTRACT

In an exchange device for gaming chip and cash currency, the gaming chip has a color or indication of value on its external surface, the exchange device comprises: a cash currency insertion opening; a cash currency reading section for obtaining authenticity information and currency information of the cash currency inserted from the cash currency insertion opening; an inserted cash currency amount display section configured to display the amount of the cash currency acquired by the cash currency reading section; a gaming chip storage section configured to store the gaming chips by type; a gaming chip dispensing section configured to dispense the gaming chips corresponding to the amount of the cash currency acquired by the cash currency reading (Continued)

section from the gaming chip storing section; a take-out section in which the paid out gaming chips are placed; and a user recognition section configured to recognize a person wishing exchange.

28 Claims, 6 Drawing Sheets

(51) Int. Cl.
 *G07D 11/225* (2019.01)
 *G07D 11/34* (2019.01)
 *G07F 17/32* (2006.01)
(52) U.S. Cl.
 CPC ......... *G07D 11/34* (2019.01); *G07F 17/3241* (2013.01); *G07F 17/3255* (2013.01)

(56) References Cited

U.S. PATENT DOCUMENTS

| | | |
|---|---|---|
| 2010/0160032 A1 | 6/2010 | Paton |
| 2012/0105215 A1* | 5/2012 | Gronau ................. G07F 17/322 235/375 |
| 2013/0116032 A1* | 5/2013 | Lutnick ............... G07F 17/3276 463/25 |
| 2019/0188958 A1 | 6/2019 | Shigeta |
| 2020/0175806 A1 | 6/2020 | Shigeta |

FOREIGN PATENT DOCUMENTS

| | | |
|---|---|---|
| JP | 2008197979 A | 8/2008 |
| JP | 2009282766 A | 12/2009 |
| JP | 2014235655 A | 12/2014 |
| KR | 100987953 B1 | 10/2010 |
| WO | 2017086413 A1 | 5/2017 |
| WO | 2018025622 A1 | 2/2018 |

OTHER PUBLICATIONS

International Search Report issued on Sep. 3, 2019 issued in PCT Application PCT/JP2019/024051.
European Search Report dated Mar. 24, 2022 issued for EP Application No. 19822578.1.
Japanese Office Action dated Jun. 28, 2022 issued for JP Application No. 2018-128619.
Japanese Office Action dated Feb. 18, 2025, issued in JP Application No. 2024-080789.

* cited by examiner

DEVICE FOR EXCHANGING GAMING CHIPS AND CASH CURRENCY

CROSS-REFERENCES TO RELATED APPLICATIONS

This application is a continuation of U.S. patent application Ser. No. 17/253,865 filed Dec. 18, 2020, which is a national phase application under 35 U.S.C. § 371 of International Application No. PCT/JP2019/024051 filed Jun. 18, 2019, which claims priority to JP Application No. 2018-128619 filed Jun. 18, 2018. The contents of each application are hereby incorporated by reference.

TECHNICAL FIELD

The present invention relates to an exchange device for gaming chips and cash currency.

BACKGROUND ART

Some of the many table games played in casinos and other amusement facilities include baccarat and blackjack. Casinos use gaming chips as a substitute currency for these games. The exchange of gaming chips and cash currency (i.e. bills and coins) is done face-to-face at a designated exchange station in the casino or on the gaming table by a cash currency exchanger or a dealer in charge of the gaming table.

On the other hand, an automatic exchange device for chips and cash currency used in amusement facilities has been proposed. In the device for automatic purchase of prize chips as described in JP2689054B, the inserted prize chips are automatically sorted, true or false of the prize chips are identified, then cash currency of amount corresponding to the value of the prize chips is automatically paid out.

Casinos are also required to introduce automatic exchange devices for gaming chip and cash currency that can be operated without human intervention. Since conventional exchange devices cannot identify the person wishing exchange P activity, and it has a problem that cannot obtain information on the exchange activity performed by a customer who is suspected of receiving.

The present invention has been invented in view of the circumstances, and provides a gaming chip and cash currency exchange device equipped with a function recognizing for the person wishing exchange P activity.

SUMMARY OF THE INVENTION

In order to solve the above problem, one aspect of the present invention is an exchange device for gaming chip and cash currency, wherein the gaming chip has a color or indication on the outer surface that represents a value, the exchange device comprising: a cash currency insertion opening; a cash currency reading section configured to acquire authenticity information and currency information of the cash currency inserted from the cash currency insertion opening; an inserted cash currency amount display section configured to display an amount of the cash currency acquired by the cash currency reading section; a gaming chip storage section configured to store the gaming chip by type; a gaming chip dispensing section configured to dispense the gaming chip corresponding to the amount of cash currency acquired by the cash currency reading section from the gaming chip storage section; and a take-out section on which the dispensed gaming chip is placed.

Further, the exchange device for gaming chip and cash currency may further comprise a user recognition section configured to recognize a person wishing exchange.

Further, in the exchange device for gaming chip and cash currency, the user recognition section may have a function to capture an image of a person wishing exchange using a camera at a time of executing the exchange and to extract and identify an image of the face of the person wishing exchange from the image captured by the camera.

Further, the exchange device for gaming chip and cash currency may further comprise a user ID information input section to which inputs ID information of the person wishing exchange, the user recognition section may have a function to identify the person wishing exchange from the information on the person wishing exchange obtained by the user ID information input section.

Further, in the exchange device for gaming chip and cash currency, the user ID information input section may be configured to obtain the information on the person wishing exchange by means of a member's card.

Further, the exchange device for gaming chip and cash currency may further comprise a user management section which stores in a database information on number of times or amount of cash currency exchanged during a predetermined period of time for a specific user recognized by the user ID recognition section.

Further, in the exchange device for gaming chip and cash currency, the user management section may be configured to grant points or status to the user under a predetermined condition, and may be capable of outputting the same.

Further, in the exchange device for gaming chip and cash currency, the user management section may be configured to allow a predetermined exchange ratio to be set for each user under a predetermined condition.

Further, the exchange device for gaming chip and cash currency may further comprise: a cash currency storage section configured to store the cash currency by type; and a cash currency holding section configured to temporarily hold the cash currency inserted from the insertion opening, the cash currency holding section may have a function to move the inserted cash currency into the cash currency storage section by type when the exchange is executed.

Further, in the exchange device for gaming chip and cash currency, the gaming chip dispensing section may have a function to pay out the gaming chips individually or in batches.

Further, in the exchange device for gaming chip and cash currency, the gaming chip may have an embedded wireless tag storing chip information, the exchange device may further comprise: a wireless tag reading section configured to read the wireless tag of the gaming chip placed on the take-out section to obtain the chip information of the gaming chip; a determining section configured to determine whether or not there is an abnormality in the chip information of the gaming chip obtained from the wireless tag reading section; and a control section configured to enable the gaming chip at the take-out section to be taken out when the determining section determines that there is no abnormality.

Further, in the exchange device for gaming chip and cash currency, the take-out section may be further provided with an openable door, the door may be closed while the determining section is determining, and the door may be opened when the determining section determines that there is no abnormality.

Further, the exchange device for gaming chip and cash currency as may further comprise an appearance inspection section which inspects an appearance of the gaming chip placed on the take-out section.

Further, the exchange device for gaming chip and cash currency may further comprise an appearance inspection section which inspects an appearance of the gaming chip placed on the take-out section, the appearance inspection section may be configured to optically ascertain number or value of the gaming chips placed on the take-out section, and the determining section may compare and determine the chip information of the gaming chip obtained from the wireless tag reading section and number or value of the gaming chips obtained from the appearance inspection section, and if both of them match, the determining section may determine that the gaming chip placed in the take-out section is free of defects.

Further, in the exchange device for gaming chip and cash currency, the gaming chip may have a multi-layered structure in which a plurality of plastic layers of different colors are stacked, with a colored layer at least in the middle, and a white layer or a light colored layer on both sides of the colored layer in the middle to form a striped pattern on the sides in the direction of stacking, so that the type of gaming chip can be identified by the colored layer, the appearance inspection section may be configured to ascertain the number or value of the gaming chip by the colored layer.

A device for exchanging gaming chips and cash currency in another embodiment of the invention is configured as follows: the gaming chip incorporates a wireless tag storing currency information and has a color or indication of value on the outside surface, the device comprises: an insertion opening through which the gaming chip can pass; a wireless tag reading section configured to read the wireless tag of the gaming chip inserted through the insertion opening and obtains the currency information on the gaming chip; a determining section configured to determine whether or not the currency information of the gaming chip obtained from the wireless tag reading section is abnormal; an inserted amount display section configured to display the amount of the gaming chip that is determined by the determining section to be free of abnormalities; a cash currency storage section configured to store the cash currency by type; and a cash currency dispensing section configured to dispense cash currency from the cash currency storage section corresponding to the amount of the gaming chips that the determining section determines to be free of abnormalities.

Further, the device for exchanging gaming chips for cash currency may further comprise a user recognition section configured to recognize a person wishing exchange.

Further, in the device for exchanging gaming chips for cash currency, the user recognition section may have a function to capture an image of a person wishing exchange using a camera at the time of executing the exchange and to extract and identify an image of the face of the person wishing exchange from the image captured by the camera.

Further, the device for exchanging gaming chips for cash currency may further comprise a user ID information input section to which ID information of the person wishing exchange is input, the user recognition section may have a function to identify a person wishing exchange from information on the person wishing exchange obtained by the user ID information input section.

Further, in the device for exchanging gaming chips for cash currency, the user ID information input section may be configured to obtain the information on the person wishing exchange by means of a member's card.

Further, the device for exchanging gaming chips for cash currency may further comprise a user management section configured to store in a database information on number of times or amount of cash currency to be exchanged during a predetermined period of time for a specific user recognized by the user ID recognition section.

Further, in the device for exchanging gaming chips for cash currency, the user management section may be configured to grant points or status to a user under a predetermined condition, and is capable of outputting the same.

Further, in the device for exchanging gaming chips for cash currency, the user management section may be configured to allow a predetermined exchange ratio to be set for each user under a predetermined condition.

Further, the device for exchanging gaming chips for cash currency may further comprise: a gaming chip storage section configured to store the gaming chips by type; and a gaming chip holding section configured to temporarily hold the gaming chip inserted through the insertion opening, the gaming chip holding section may have a function to move the inserted gaming chips to the gaming chip storage section by type when executing the exchange.

Further, the device for exchanging gaming chips for cash currency may further comprise an appearance inspection section configured to inspect an appearance of the gaming chip inserted through the insertion opening.

Further, in the device for exchanging gaming chips for cash currency, the appearance inspection section may have a function to optically ascertain the number or value of gaming chips inserted through the insertion opening, the determining section may be configured to compare and determine the chip information of the gaming chip obtained from the wireless tag reading section and the number or value of the gaming chip obtained from the appearance inspection section, and if both of them match, the gaming chip may be determined to be free of abnormalities.

Further, in the device for exchanging gaming chips for cash currency, the gaming chip may have a multi-layered structure in which a plurality of plastic layers of different colors are stacked, with a colored layer at least in the middle, and a white layer or a light colored layer on both sides of the colored layer in the middle to form a striped pattern on the sides in the direction of stacking, so that the type of gaming chip can be identified by the colored layer, the appearance inspection section may be configured to ascertain the number or value of the gaming chips by the colored layer.

An exchange device for a gaming chip and cash currency in another embodiment of the present invention is configured as follows: the gaming chip incorporates a wireless tag storing currency information and has a color or indication of value on the outside surface, the exchange device comprises: an insertion opening through which the cash currency or the gaming chip can pass; a cash currency reading section configured to acquire authenticity information and currency information of the cash currency inserted from the insertion opening; a wireless tag reading section configured to read the wireless tag of the gaming chip inserted through the insertion opening and obtains currency information on the gaming chip; a determining section configured to determine whether or not the currency information of the gaming chip obtained from the wireless tag reading section is abnormal; an inserted amount display section configured to display the amount of cash currency obtained by the cash currency reading section or the amount of the gaming chip that is determined by the determining section to be free of abnormalities; a gaming chip storage section configured to store the gaming chips by type; a cash currency storage section configured to store the cash currency by type; a gaming chip dispensing section configured to dispense the gaming chips corresponding to the amount of cash currency acquired by the cash currency reading section from the gaming chip storage section; a take-out section on which the disbursed gaming chips are placed; and a cash currency dispensing section configured to dispense the cash currency from the cash currency storage section corresponding to the amount of gaming chips that the determining section determines to be free of abnormalities.

According to the exchange device for gaming chip and cash currency of the present invention, it is possible to identify a user who has carried out a gaming chip and cash currency exchange using the device.

BRIEF DESCRIPTION OF THE DRAWINGS

The embodiments of the present invention will be described with reference to the drawings.

DESCRIPTION OF PREFERRED EMBODIMENTS

Cash currency, as used in this description, includes coin, hard cash, or hard currency and bank bill, banknote, or paper currency.

Figure 1:
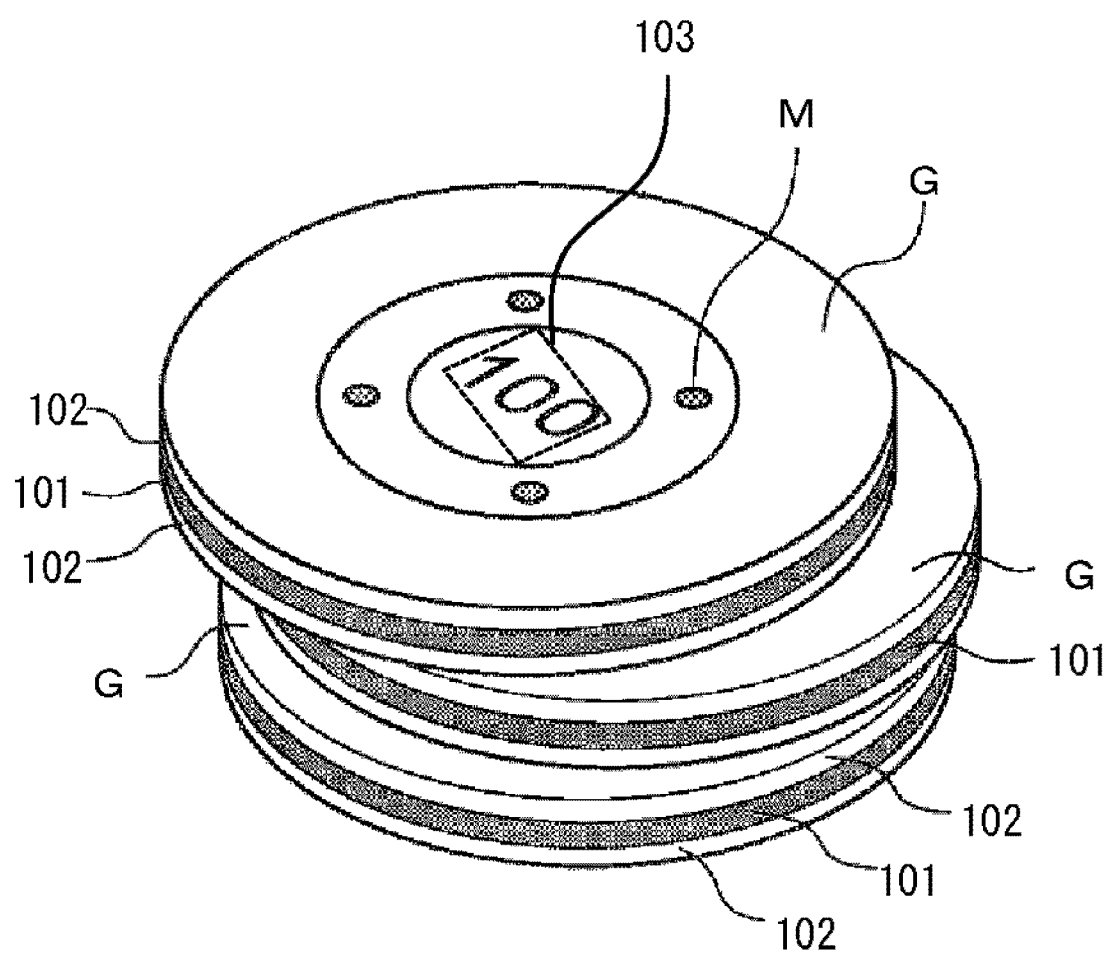
FIG. 1 is an oblique view of stacked gaming chips in an embodiment of the present invention.

First, details of the gaming chip G used in the device will be described. As shown in FIG. 1, the gaming chip G has a multi-layered structure with at least a colored layer 101 in the middle, and a white layer 102 or a light-colored layer (which is not shown in the figure, but can be a lighter-colored layer than the colored layer 101) laminated on both sides of the middle colored layer 101. As shown in FIG. 1, this multi-layered structure forms a striped pattern on the sides of the chip in the direction of stacking, allowing the type of gaming chip G to be identified by identifying the color of the colored layer 101. A wireless tag 103 is also incorporated in the gaming chip G. Specifically, a portion of the colored layer 101 is hollowed out, and a wireless tag 103 is installed in the hollow. In addition to the value (amount) information of the gaming chip G, the wireless tag 103 stores unique ID information set for each casino, manufacturing information and related information such as the manufacturing line and manufacturing date, individual ID information for each chip, and other information as currency information.

Figure 2:
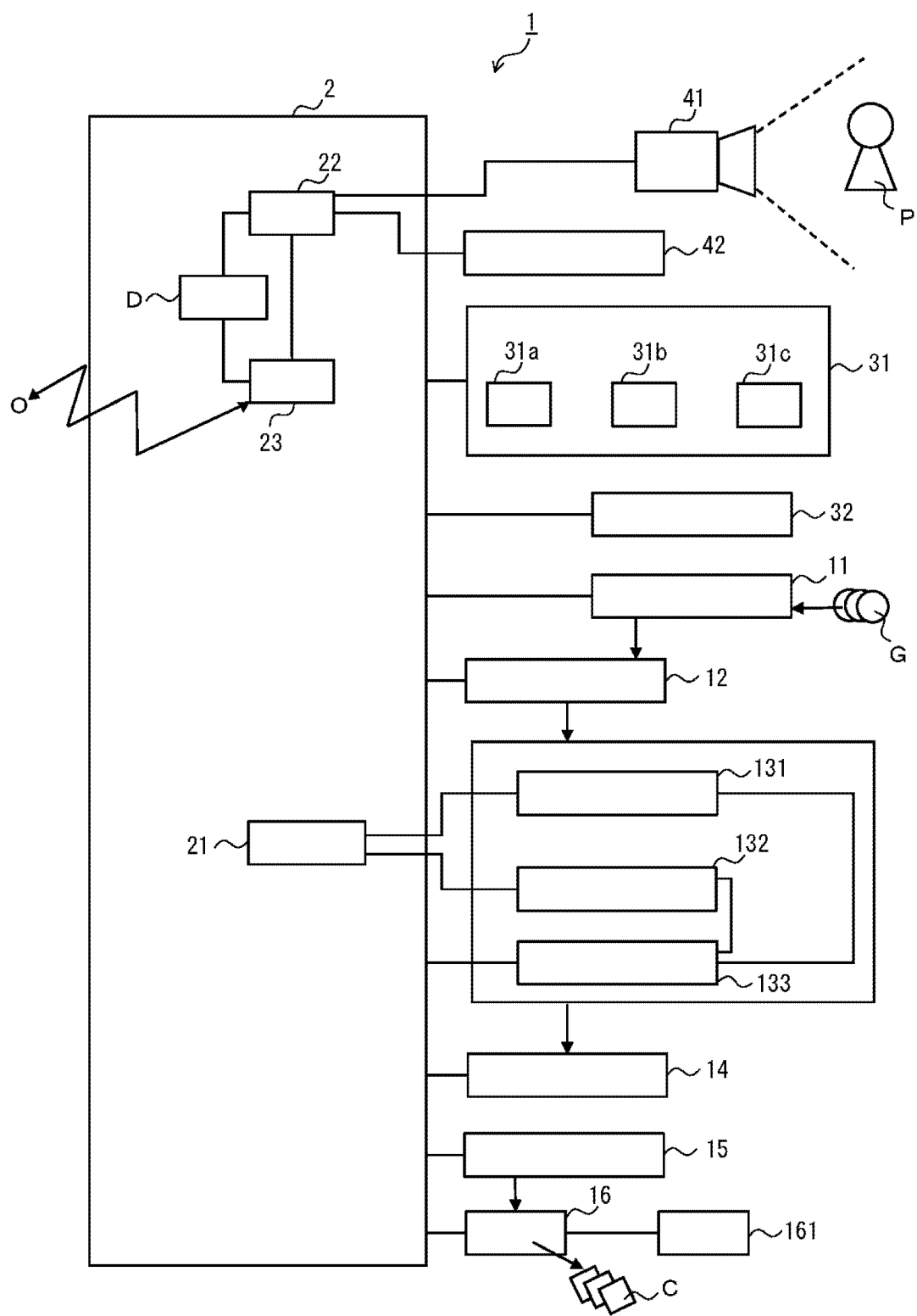
FIG. 2 is a diagram illustrating an overall configuration of an exchange device for gaming chips and cash currency in a first embodiment of the present invention.

FIG. 2 shows an exchange device 1 of a gaming chip G and cash currency C in a first embodiment of the present invention. The exchange device 1 of gaming chip G and cash currency C is provided with an insertion opening 11 through which the gaming chip G can pass to insert the gaming chip G to be exchanged into the exchange device 1.

The exchange device 1 is provided with a gaming chip holding section 12 that temporarily holds a gaming chip G inserted through the insertion opening 11.

The exchange device 1 is provided with a wireless tag reading section 131 that reads a wireless tag 103 of a gaming chip G inserted from the insertion opening 11 and held in a gaming chip holding section 12, and obtains currency information of the gaming chip G. Further, a determining section 21 is provided to determine whether or not there is an abnormality in the currency information of the gaming chip G obtained from the wireless tag reading section 131. The determining section 21 sets in advance as an abnormality of the currency information, the abnormality includes situations in which, for example, the unique ID information of the casino cannot be read, or the expiration date of the chip based on the manufacturing date information of the gaming chip G has been reached, etc., and determines whether or not an abnormality exists based on the criteria for the abnormality set in advance. When the determining section 21 determines there is an abnormality, it is processed as an error, and the contents of the error are displayed on the display 31 provided in the exchange device 1. Details of the display 31 will be described later.

The exchange device 1 is further provided with an appearance inspection section 132 that inspects the appearance of the gaming chip G held in the gaming chip holding section 12. The appearance inspection section 132 can, for example, use a camera to optically ascertain the condition of the gaming chip and detect damage, dirt, or the like. In addition, an infrared camera or the like may be used to read a special mark M or the like on the surface of the gaming chip to determine the authenticity of the gaming chip. Based on the appearance information of the gaming chip G obtained from the appearance inspection section 132, the determining section 21 determines whether or not there is an abnormality based on the predetermined criteria of abnormality. If the determining section 21 determines an abnormality, it is processed as an error and the error details are displayed on the display 31 provided in the exchange device 1. The appearance inspection section 132 may read the information on the outer surface (e.g., denomination information of cash currency appeared on the surface or the color information of the colored layer 101) to ascertain the type and number of chips for gaming G inserted.

The determining section 21 may compare and determine the currency information of the gaming chip G obtained from the wireless tag reading section 131 and the currency information of the gaming chip G obtained from the appearance inspection section 132, and may determine whether or not they match, and if they do, determine the inserted gaming chip G to not be abnormal.

The exchange device 1 is equipped with a chip counter 133 that counts the number of chips of each type of inserted gaming chip G based on the currency information of the gaming chip G obtained from the wireless tag reading section 131 or the appearance inspection section 132. The chip counter 133 further calculates the total amount of the inserted gaming chips G by adding the individual amounts of the gaming chips G that are determined by the determining section 21 not to be abnormal.

The total amount of gaming chips G calculated by the chip counter 133 is displayed on an inserted amount display section 32. The inserted amount display section 32 may be integrated with the display 31.

The display 31 provided in the exchange device 1 will be described here. The display 31 in this embodiment is a touch display. The display 31 has an exchange start button 31*a*, a button for executing the exchange execution button 31b, and a exchange cancellation button 31c. The display 31 does not need to be a touch display. The exchange start button 31a, the exchange execution button 31b, and the exchange cancellation button 31c do not necessarily have to be displayed on the display 31 and may be provided separately from the display 31. The exchange start button 31a will be described below.

When the total amount of the inserted gaming chips G is displayed on the inserted amount display section 32, the display 31 displays the exchange execution button 31b and the exchange cancellation button 31c. When the amount of cash currency displayed in the inserted amount display section 32 is confirmed by the person wishing exchange P and the cash currency exchange is cancelled, the gaming chip G held in the gaming chip holding section 12 is returned to the cash currency exchanger P from the predetermined return port (not shown) by pressing the exchange cancellation button 31c. When the cash currency exchange is executed, the cash currency exchange is executed by pressing the exchange execution button 31b, and the chips held in the gaming chip holding section 12 are sent to the gaming chip storage section 14 by means of a pusher or conveyor.

The gaming chip storage section 14 stores the gaming chips G sent from the gaming chip holding section 12 at the time of exchange execution. The gaming chip storage section 14 can store gaming chips G by type. The gaming chip storage section 14 is designed to be removable from the main body of the exchange device, which allows for easy collection of gaming chips G in the exchange device 1 by the casino staff.

The exchange device 1 is equipped with a cash currency storage section 15 for storing cash currency C for disbursement by type. The replenishment of cash currency C into the cash currency storage section 15 may be performed periodically by the casino staff or the person in charge of the management of the exchange device 1, and the cash currency storage section 15 may be structured so that more than one types of currency can be stored. In addition, the exchange device 1 is equipped with a cash currency dispensing section 16 that dispenses cash currency for dispensing from the cash currency storage section 15. The cash currency dispensing section 16 disburses, by means of a pusher or a conveyor, the cash currency C corresponding to the total amount of gaming chips G, which is determined by the determining section 21 not to be abnormal, from the cash currency storage section 15 in accordance with the instructions of the control section 2, which controls the entire apparatus. The cash currency dispensing section 16 is equipped with a cash currency counter 161, which confirms the type and number of cash currency to be disbursed from the cash currency storage section 15. The cash currency exchanger P receives the disbursed cash currency C from the withdrawal point (not shown).

The control section 2, which controls the entire device, has a user recognition section 22 and a user management section 23.

The user recognition section 22 obtains identifying information to identify a person wishing exchange P. The identifying information is a face image information of the customer concerned or a user ID registered in the database D. The both of the information is associated with each other on the database.

In the standby state, the exchange device 1 has the exchange start button 31a on the display. When the exchange start button 31a is pressed, the user recognition section 22 captures an image of the cash currency exchanger P using the camera 41, and extracts the face image of the person wishing exchange P from the captured image. The extracted face image is checked against the face image data of casino customers in the database D, and when the face image data matches a specific face image data in the database D thereby the face image data is identified, the person wishing exchange P can be identified as the identifying information is obtained.

In the case where the face image of the person wishing exchange P could not be extracted, or where the person wishing exchange P is a new user who has not been registered in the database D, etc., thereby no identifying information can be obtained due to failure to match the face image data in the database D, a message indicating that the exchange cannot be executed is displayed on display 31. In addition, a message encouraging the user to exchange at a predetermined exchange place in the casino may be displayed.

An artificial intelligence type device using deep learning technology can be used to extract a face image of the person wishing exchange P from the image captured by the camera 41 and to identify the person wishing exchange P by comparing the extracted face image with the face image on the database D.

The camera 41 captures images of a person wishing exchange P when the person wishing exchange P presses the exchange start button 31a displayed on the display 31, but the image may be captured after the exchange is made or the image may be captured at all times.

Instead of the camera 41, the exchange device 1 may obtain the identifying information by the user ID information input section 42 to identify the person wishing exchange P. In this case, the information obtained by reading the member's card or passport is checked against the customer information in the database D, and when the user ID is identified in database D, the identifying information is obtained and the person wishing exchange P is identified. The user ID information input section may obtain the identifying information by directly receiving the user ID through keyboard input or touch screen input on the display 31. Fingerprint information and vein information of customers may be stored in the database D as identifying information, and the person wishing exchange P may be identified by identifying the customer in the database D by fingerprint authentication or vein authentication.

Furthermore, both identification of a person wishing exchange P using camera 41 as described above and identification of a person wishing exchange P using the user ID information input section 42 as described above may be performed. In addition, it may be switched to identifying the person wishing exchange P using the user ID information input portion 42 when the above-described camera 41 fails to identify the person wishing exchange P. The user ID information input portion 42 may be used to identify the person wishing exchange P.

The user management section 23 stores information on the number of times or amount of cash currency exchanged in a predetermined period of a user (person wishing exchange P) identified by the user recognition section 22 in the database D. In accordance with predetermined conditions, points or statuses can be granted to the user and output the points or statuses. The points may be used to avail of preferential treatment at a hotel or restaurant attached to a casino, for example, or a qualification for admission to a VIP room or other special area may be obtained by obtaining a predetermined status.

Furthermore, it is possible to set a predetermined exchange ratio for each user under predetermined conditions. For example, it may be set that $110 of cash currency C will be paid out for $100 of inserted gaming chips G to a user who has a total exchange of $10,000 or more in a month. It may also be configured to provide special gaming chips G with different conversion rates or dividend rates.

The user management section 23 may be connected to an external system or external server by wire or wirelessly. This allows, for example, access to an external database O in the casino's customer management system to make comparisons and judgments or to share the acquired data between a plurality of exchange devices 1 in the casino.

Figure 3:
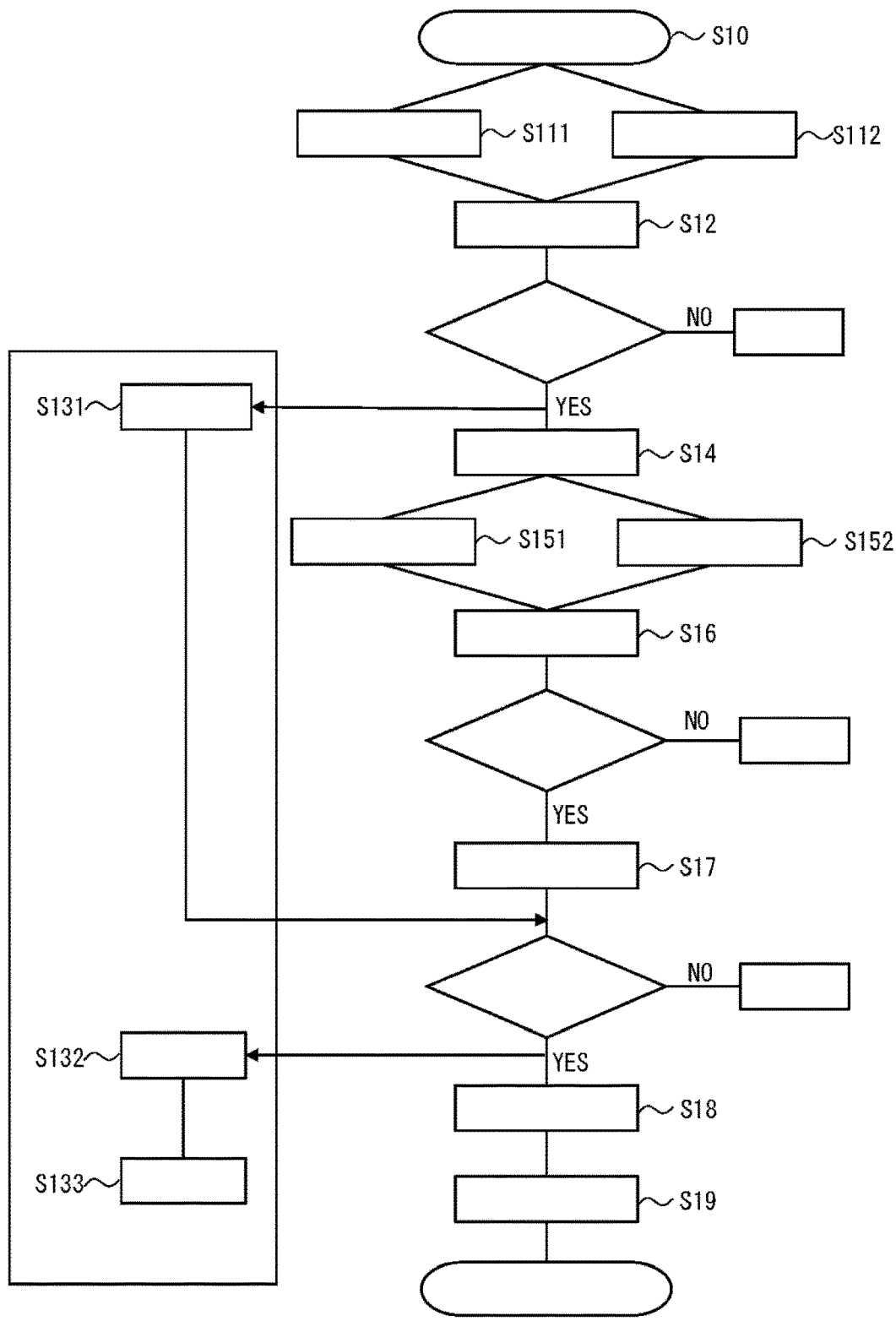
FIG. 3 is a flow diagram of an exchange process of gaming chips and cash currency in the exchange device in the first embodiment of the present invention.

Next, the operation of the exchange of the gaming chip G for cash currency C will be described. FIG. 3 is a flow diagram of the exchange process from gaming chip G to cash currency C.

In the standby state, the exchange device 1 displays the exchange start button 31a on the display 31. Alternatively, when a person wishing exchange P comes in front of the exchange device 1, the presence of the person wishing exchange P may be detected by a sensing sensor or the like, and the display 31 may be activated, and the exchange start button 31a is displayed on the display 31. The exchange start button 31a, the exchange execution button 31b and the exchange cancellation button 31c, which will be described later, do not necessarily have to be displayed on the display 31 and may be provided separately from the display 31.

When the exchange start button 31a is pressed by the person wishing exchange P, the cash currency exchange process is started (step S10). The exchange operation begins by recognizing the person wishing exchange P. The user recognition section 22 captures an image of the person wishing exchange P using the camera 41 (step S111), extracts the face of the person wishing exchange P from the captured image, matches the extracted face image with the face image data of the casino customers in the database D, and identifies the person wishing exchange P (step S12). Another method of recognition is to identify the person wishing exchange P by inputting a user ID using a member's card or the like by the user ID information input section 42 (step S112).

If the user recognition section 22 is unable to identify the person wishing exchange P, an error signal is output and an error message is displayed on the display 31 to the effect that the exchange is not allowed to be carried out. In addition, if the user is recognized as a user who is on a so-called black list or who has imposed a restriction on the use of the exchange device 1, the function of the exchange device 1 is stopped or the insertion of the chip into the insertion opening 11 is made impossible, and it is notified that the exchange device 1 is not allowed to be use by way of display on the display 31 or an alarm.

After identifying the person wishing exchange P by the user recognition section 22, the determination process (step S131) of the exchange ratio between the gaming chip G and the cash currency C to the person wishing exchange P is performed based on the past exchange information and benefit information stored in the database D.

When the person wishing exchange P is identified, a notice is displayed on the display 31 urging insertion of the gaming chip G, and the person wishing exchange P inserts the gaming chip G (S14). The inserted gaming chip G is sent to the gaming chip holding section 12.

The gaming chip G held in the gaming chip holding section 12 is read by the wireless tag reading section 131, which reads the wireless tag 103 embedded in the gaming chip G, and information on the authenticity and value of the inserted gaming chip G is obtained (step S151).

The condition of the gaming chip G is also ascertained by the appearance inspection section 132, and information on the authenticity and value of the chip is obtained by detecting damage, dirt, etc. (S152).

The currency information of the gaming chip G obtained by the wireless tag reading section 131 and the appearance inspection section 132 is judged by the determining section 21 to determine whether the gaming chip G meets predetermined criteria established by the casino and determine the authenticity and value of the gaming chip G (step S16). A gaming chip G that does not meet the criteria is considered to be an abnormal item and an error signal is output and the error information is notified on the display 31.

If there is no abnormality in the gaming chips G, the inserted amount of the inserted gaming chips G is displayed in the inserted amount display section 32 (step S17), and the person wishing exchange P confirms the amount displayed in the inserted amount display section 32. The display 31 also displays the exchange execution button 31b and the exchange cancellation button 31c. When the exchange is cancelled, the gaming chip held in the gaming chip holding section 12 is returned from the predetermined return port (not shown) by pressing the exchange cancellation button 31c.

The exchange is executed by pressing the exchange execution button 31b, and an amount of cash currency is disbursed from the cash currency disbursement section 16 in accordance with the amount of the inserted gaming chip that is determined based on the exchange ratio between the gaming chip and cash currency for each user having been determined by the user management section 23 (Step S18), and the person wishing exchange P receives the disbursed cash currency C from the withdrawal point (not shown).

The user management section 23 stores the exchange information (such as the amount of cash currency exchanged and the time of cash currency exchange) in the database (step S132) and grants points to the person wishing exchange P based on the exchange information (step S133).

After the cash currency C is disbursed, the gaming chip holding section 12 moves the gaming chip G held in the gaming chip holding section 12 to the gaming chip storage section 14 by a pusher or conveyor mechanism (step S19).

As described above, according to the present embodiment, it is possible to identify a person wishing exchange P at the time of exchange from the gaming chip G to the cash currency C, and it is possible to associate the person wishing exchange P with exchange information.

The second embodiment of the present invention will now be described using FIG. 4. Parts that perform the same operation as in the first embodiment will be described in the second embodiment using the same sign as in the first embodiment.

Figure 4:
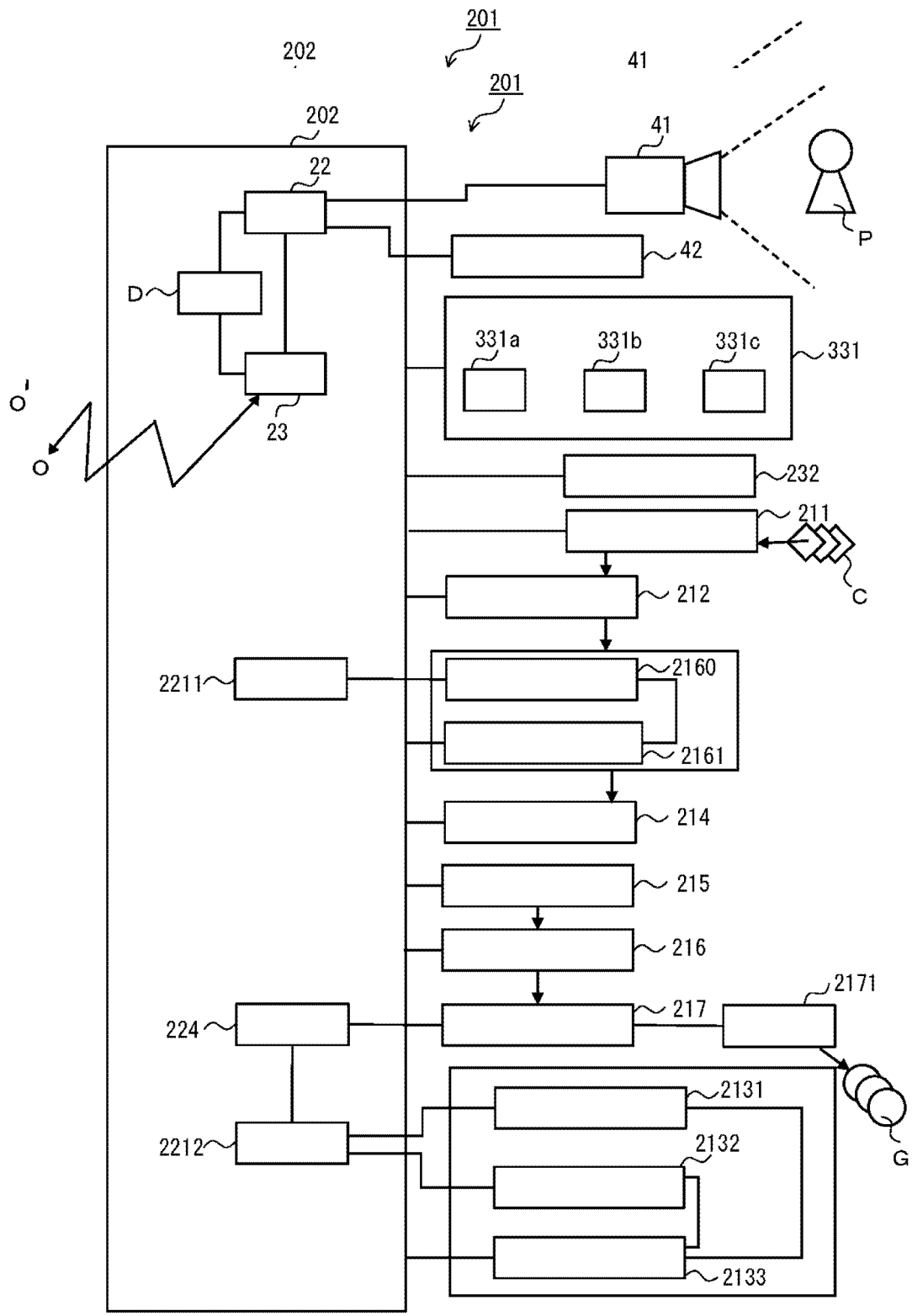
FIG. 4 illustrates an overall configuration of an exchange device for the gaming chip and cash currency in a second embodiment of the present invention.

FIG. 4 shows an exchange device 201 of the second embodiment for exchanging the cash currency C and the gaming chip G. The exchange device 201 for the cash currency C and the gaming chip G is provided with a cash currency insertion opening 211 through which the cash currency C to be exchanged can be inserted into the exchange device 201.

The exchange device 201 is provided with a cash currency holding section 212 that temporarily holds the cash currency C inserted from the cash currency insertion opening 211.

The exchange device 201 is provided with a cash currency reading section 2160 that obtains the authenticity and currency information of the cash currency C inserted from the cash currency insertion opening 211 and held in the cash currency holding section 212. Further, the exchange device 201 is provided with a cash currency determining section 2211 that determines abnormality of the cash currency based on the authenticity of the cash currency and the currency information obtained from the cash currency reading section 2160. The cash currency determining section 2211 sets in advance criteria of abnormality of the currency information, such as a case where the authenticity of the cash currency is unknown or the type of the cash currency cannot be identified, and determines whether or not there is an abnormality based on the criteria of the abnormality set in advance. When an abnormality is detected by the cash currency determining section 2211, the abnormality is treated as an error and the error details are displayed on the display 31 provided in the exchange section 201. Details of the display 31 are described below.

The exchange device 201 is equipped with a cash currency counter 2161 that counts the number of each type of cash currency C inserted, based on the currency information obtained from the cash currency reading section 2160. The cash currency counter 2161 further calculates a total amount of the inserted cash currency C by adding the individual amounts of the cash currency C that the cash currency determining section 2211 has determined to be free of abnormalities.

The total amount of cash currency C calculated by the cash currency counter 2161 is displayed on the inserted cash currency amount display section 232. The inserted cash currency amount display section 232 may be integrated with the display 31.

When the total amount of the inserted cash currency C is displayed by the inserted cash currency amount display section 232, the display 31 shows the exchange execution button 31b and the exchange cancellation button 31c. When the amount of cash currency displayed by the inserted cash currency amount display section 232 is confirmed by the person wishing exchange P and the exchange is cancelled, the cash currency C held in the cash currency holding section 212 is returned to the person wishing exchange P from a predetermined return port (not shown) by pressing the exchange cancellation button 31c. The cash currency exchange is executed by pressing the exchange execution button 31b, and the cash currency C held in the cash currency holding section 212 is sent to the cash currency storage section 214 by means of a pusher or conveyor.

The cash currency storage section 214 stores the cash currency C sent from the cash currency holding section 212 at the time of exchange execution. The cash currency storage section 214 can store the cash currency C by type. The cash currency storage section 214 is designed to be removable from the main body of the exchange device, which allows for easy collection of the cash currency C in the exchange device 201, which is performed by the casino staff.

The exchange device 201 has a gaming chip storage section 215 that stores gaming chips G for payout by type. The setting of gaming chips G into the gaming chip storage section 215 is performed periodically by the casino staff and the manager of the exchange device 201. In addition, the exchange device 201 is provided with a gaming chip dispensing section 216 that dispenses the gaming chips G for payout from the gaming chip storage section 215. The gaming chip dispensing section 216, in accordance with the instructions of the controller 202 controlling the entire apparatus, determines types and number of the gaming chip G to be disbursed from the gaming chip storage section 215 using a pusher or a conveyor, the gaming chip to be disbursed corresponds to the total amount of cash currency C determined by the cash currency determining section 2211 to be free of abnormalities.

The gaming chips G paid out of the gaming chip dispensing section 216 are sent to the gaming chip take-out section 217.

The exchange device 201 is provided with a wireless tag reading section 2131 that reads the wireless tag 103 of the gaming chip G sent from the gaming chip dispensing section 216 to the gaming chip take-out section 217 and obtains the currency information of the gaming chip G. Further, a determining section 2212 is provided to determine whether or not there is an abnormality in the currency information of the gaming chip G obtained from the wireless tag reading section 2131. The determining section 2212 sets in advance abnormalities of the currency information as criteria, for example, when the unique ID information of the casino cannot be read, or when the expiration date of the chip based on the manufacturing date information of the gaming chip G has been reached, and the determining section 2212 determines whether or not there is an abnormality based on the criteria of the abnormality set in advance. If the determining section 2212 determines an abnormality, it is treated as an error and the error details are displayed on the display 31 provided in the exchange section 201.

The exchange device 201 further comprises an appearance inspection section 2132 that inspects the appearance of the gaming chip G sent to the gaming chip take-out section 217. The appearance inspection section 2132 can, for example, use a camera to optically ascertain the condition of the gaming chip and detect damage, dirt, and the like. In addition, an infrared camera or the like may be used to read a special mark M or the like on the surface of the gaming chip to determine the authenticity of the gaming chip. Based on the appearance information of the gaming chip G obtained from the appearance inspection section 2132, the determining section 2212 determines whether or not there is an abnormality based on predetermined criteria of abnormality. If the determining section 2212 determines an abnormality, it is treated as an error and the error details are displayed on the display 31 provided in the exchange device 201. The appearance inspection section 2132 may also read the information on the outer surface (e.g., amount information on the surface and color information of the colored layer 101) to ascertain the type and number of the gaming chips G sent to the gaming chip take-out section 217.

The determining section 2212 may, compare and determine the currency information of the gaming chip G obtained from the wireless tag reading section 2131 and the currency information of the gaming chip G obtained from the appearance inspection section 2132, determine whether or not they match, and if they do, determine the inserted gaming chip G to be free of defects.

The exchange device 201 is provided with a chip counter 2133 that counts the number of chips of each type of gaming chip G sent to the gaming chip take-out section 217 based on the currency information of the gaming chip G obtained from the wireless tag reading section 2131 or the appearance inspection section 2132. The chip counter 2133 further adds the individual amounts of the gaming chips G that are determined by the determining section 2212 to be free of abnormalities and calculates the total amount of the gaming chips G sent to the gaming chip take-out section 217.

The gaming chip take-out section 217 is provided with a door 2171 that restricts the take-out of the gaming chip G from the gaming chip take-out section 217. The door 2171 is closed while the determining section 2212 is determining to restrict the taking out of the gaming chip G from the gaming chip take-out section 217. When the determining section 2212 determines that there is no abnormality, the control section 224 opens the door 2171 and allows the gaming chip G placed in the gaming chip take-out section 217 to be taken out of the gaming chip take-out section 217.

The controller 202, which controls the entire device, has a user recognition section 22 and a user management section 23.

The user recognition section 22 obtains identifying information to identify a person wishing exchange P. The identifying information is face image information of the customer or a user ID. The face image information and the user ID are associated with each other on the database.

In the standby state, the exchange device 201 displays the exchange start button 31a on the display. When the exchange start button 31a is pressed, the user recognition section 22 captures an image of the person wishing exchange P using the camera 41, and extracts the face image of the person wishing exchange P from the captured image. The extracted face image is checked against the face image data of the casino customers in the database D, and when face image data is identified in agreement with the specific face image data in the database D, the identifying information is obtained, and the person wishing exchange P can be identified.

If no identifying information can be obtained due to failure to match the face image data in the database D, for example, in the case where the face image of the person wishing exchange P could not be extracted, or where the person wishing exchange P is a new user who is not registered in the database D, etc., a message indicating that the exchange cannot be executed is displayed on display 31. In addition, a message encouraging the user to exchange at a predetermined exchange in the casino may be displayed.

An artificial intelligence type device using deep learning technology can be used in extracting an image of the face of the person wishing exchange P from the image captured by the camera 41, and in identifying the person wishing exchange P by comparing the extracted face image with the face image on the database D.

A timing when the camera 41 captures the person wishing exchange P is when the person wishing exchange P presses the exchange start button 31a displayed on the display 31, but the camera 41 may capture the image after the cash currency exchange is performed, or the camera 41 may capture the image at all times.

The exchange device 201 may identify the person wishing exchange P by obtaining the identifying information by the user ID information input section 42 instead of the camera 41. In this case, the identifying information is obtained when the user ID is identified on the database D by reading the member's card or passport, and the identifying information is obtained when the user ID is identified on the database D, and the person wishing exchange P is identified. The user ID information input section may obtain the identifying information by directly inputting the user ID by keyboard input or touch screen input on the display 31. The exchange device 201 may be configured in which fingerprint information and vein information of the customer are stored in the database D as identifying information, and the person wishing exchange P may be identified by identifying the customer in the database D using fingerprint or vein authentication.

Furthermore, both of the identification of the person wishing exchange P using the camera 41 as described above and identification of the person wishing exchange P using the user ID information input section 42 as described above may be performed. In addition, exchange device 201 may be configured to switch to the identification of the person wishing exchange P by the user ID information input section 42 when the above-described identification by camera 41 is not possible.

The user management section 23 stores, in the database, information on the number of times of the cash currency exchanges or amount of cash currency exchanged in a predetermined period by a user (person wishing exchange P) identified by the user recognition section 22. In accordance with predetermined conditions, points or statuses can be granted to the user and output the points or statuses. The points may be used to avail of preferential treatment at a hotel or restaurant attached to a casino, for example, or qualification for admission to a VIP room or other special area may be obtained by obtaining a predetermined status.

Furthermore, a predetermined exchange ratio can be set for each user under predetermined conditions. For example, it may be set that a user who has a total exchange value of $10,000 or more per month can receive a gaming chip G equivalent to $110 for $100 in inserted cash currency C. It may also be configured to provide special gaming chips G with different conversion rates and dividend rates.

The user management section 23 may be connected to an external system or external server by wire or wirelessly. This allows, for example, access to an external database O in the casino's customer management system to make comparisons and judgments or to share the acquired data between a plurality of exchange devices 201 in the casino.

Figure 5:
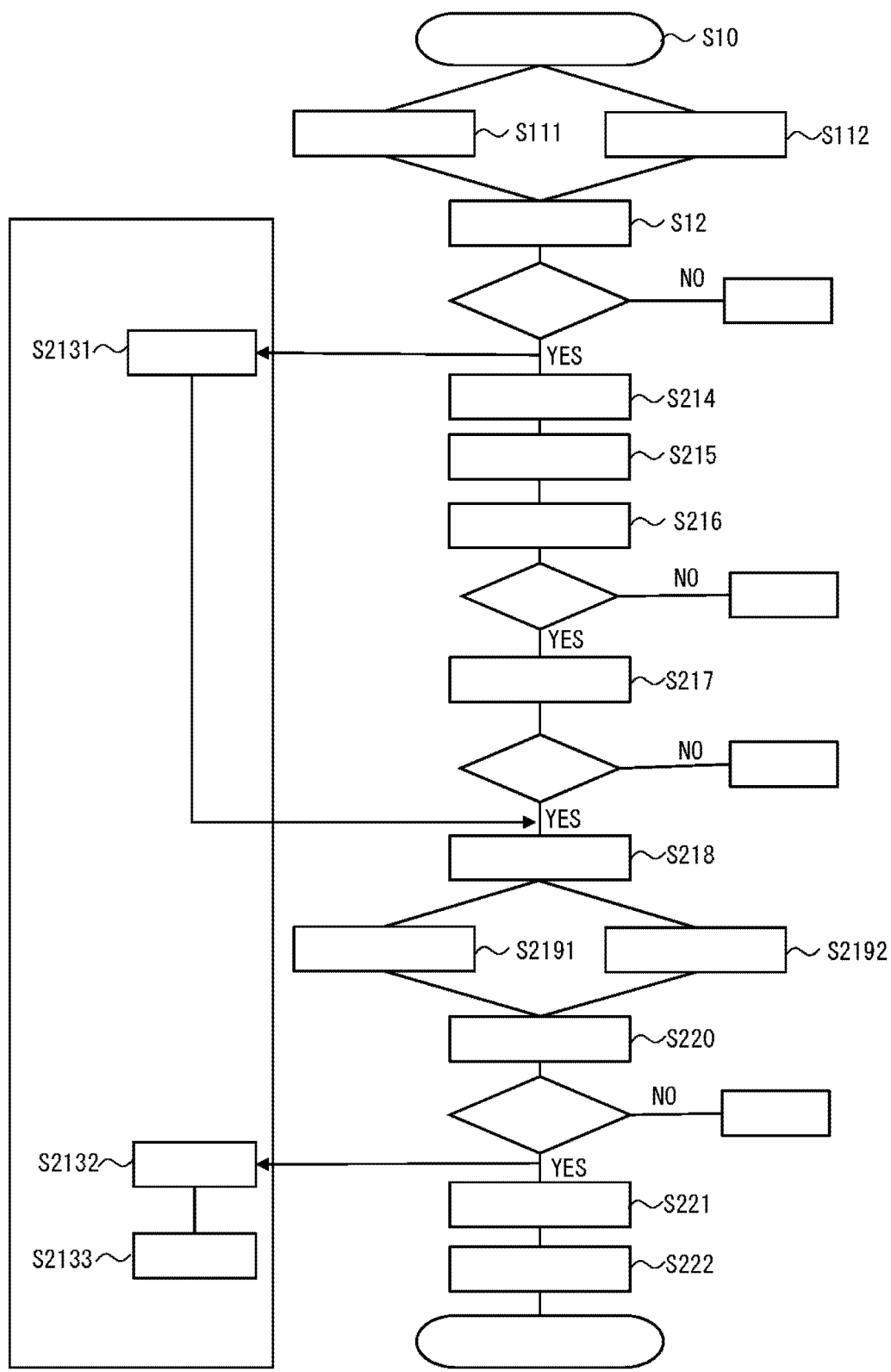
FIG. 5 is a flow diagram of an exchange process of gaming chips and cash currency in the exchange device in the second embodiment of the present invention.

Next, the operation of the exchange of cash currency C for gaming chip G will be described. FIG. 5 is a flow diagram of the exchange process from cash currency C to gaming chip G.

In the standby state, the exchange device 201 displays the exchange start button 31a on the display 31. Alternatively, when the person wishing exchange P comes in front of the exchange device 201, the presence of the person wishing exchange P may be detected by a sensing sensor or the like, and the display 31 may be activated and the exchange start button 31a is displayed on the display 31. The exchange start button 31a, the exchange execution button 31b, and the exchange cancellation button 31c, which will be described later, need not necessarily be displayed on the display 31 and may be provided separately from the display 31.

When the exchange start button 31a is pressed by the person wishing exchange P, the cash currency exchange process is started (step S10). The exchange operation begins by recognizing the person wishing exchange P. The user recognition section 22 captures an image of the person wishing exchange P using the camera 41 (step S111), extracts the face of the person wishing exchange P from the captured image, matches the extracted face image with the face image data of the casino customers in the database D, and identifies the person wishing exchange P (step S12). Another method of recognition is to identify the person wishing exchange P by inputting a user ID using a member's card or the like by the user ID information input section 42 (step S112).

If the user recognition section 22 fails to identify the person wishing exchange P, it outputs an error signal and displays an error message on the display 31 to the effect that the exchange is not allowed to be carried out. In addition, if the user is recognized as a user who is on a so-called black list or who has imposed a restriction on the use of the exchange device 201, the function of the exchange device 201 is stopped or the insertion of the chip into the insertion opening 211 is made impossible, and it is notified that the exchange device 201 is not allowed to be use by way of display on the display 31 or an alarm.

After identifying the person wishing exchange P by the user recognition section 22, the process of determining the exchange ratio of the cash currency C and the gaming chips G to the person wishing exchange P is performed (step S2131) based on past exchange information and benefit information stored in the database D.

When the person wishing exchange P is identified, a notice is displayed on the display 31 urging insertion of cash currency C, and the person wishing exchange P inserts the cash currency C (S214). The inserted cash currency C is sent to the cash currency holding section 212.

From the cash currency C held in the cash currency holding section 212, the information on the authenticity and type of the inserted cash currency C inserted is acquired by the cash currency reading section 2160 (step S215).

The information on the cash currency C obtained by the cash currency reading section 2160 is judged by the cash currency determining section 2211 to determine whether the cash currency C meets the predetermined criteria established by the casino and whether the cash currency C is genuine and valuable (step S216). The cash currency C that does not meet the criteria is considered to be an abnormal item and an error signal is output and the error information is notified on the display 31.

If there is no abnormality in the cash currency C, the inserted amount of the inserted cash currency C is displayed on the inserted cash currency amount display section 232 (step S217), and the person wishing exchange P confirms the amount displayed on the inserted cash currency amount display section 232. The display 31 also shows the exchange execution button 31*b* and the exchange cancellation button 31*c*. When the cash currency exchange is cancelled, by pressing the exchange cancellation button 31*c*, the cash currency C held in the cash currency holding section 212 is returned from the predetermined return slot (not shown).

The exchange is executed by pressing the exchange execution button 31*b*, and an amount of the gaming chip G is paid out to the gaming chip dispensing section 216 by a pusher or conveyor mechanism to the gaming chip take-out section 217 in accordance with the amount of the inserted cash currency C that is determined based on the exchange ratio between the cash currency C and the gaming chip G for each user having determined by the user management section 23 (step S218).

The gaming chip G sent to the gaming chip take-out section 217 is read by the wireless tag reading section 2131, which reads the wireless tag 103 embedded in the gaming chip G, and information on the authenticity and value of the gaming chip G sent to the gaming chip take-out section 217 is acquired (step S2191).

The condition of the gaming chip G is also ascertained by the appearance inspection section 2132, to detect damage, dirt, etc. and obtain information on the authenticity and the value (S2192).

The currency information of the gaming chip G obtained by the wireless tag reading section 2131 and the appearance inspection section 2132 is judged by the determining section 2212 to determine whether the gaming chip G meets predetermined criteria established by the casino and determine the authenticity and value of the gaming chip G (step S220). A gaming chip G that does not meet the criteria is considered to be an abnormal item and an error signal is output and the error information is notified on the display 31.

If there is no abnormality in the state of the gaming chip G, the control section 224 opens the door 2171 of the gaming chip take-out section 217 (step S221).

The user management section 23 stores the exchange information (such as the amount of cash currency exchanged and the time of cash currency exchange) in a database (step S2132) and grants points to the person wishing exchange P based on the exchange information (step S2133).

After disbursing the gaming chips G, the cash currency holding section 212 moves the cash currency C held in the cash currency holding section 212 to the cash currency storage section 214 by a pusher or conveyor mechanism (step S222).

As described above, according to the present embodiment, it is possible to identify a person wishing exchange P at the time of exchange from the cash currency C to the gaming chip G, and it is possible to associate the person wishing exchange P with exchange information.

The third embodiment of the present invention will now be described using FIG. 6. Parts that perform the same operation as in the first and second embodiments will be described in the third embodiment using the same sign as in the first and second embodiments.

Figure 6:
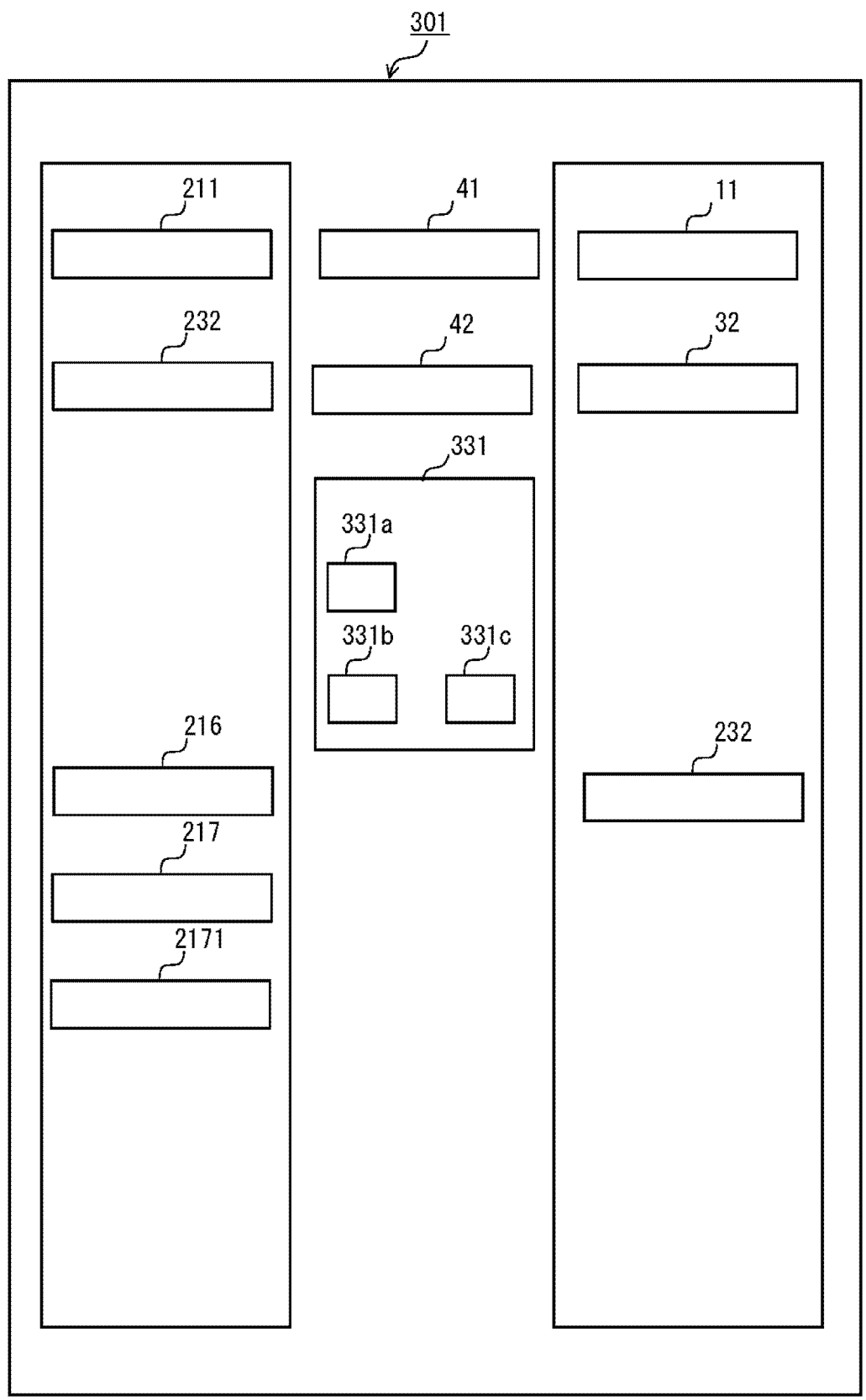
FIG. 6 is a diagram illustrating an overall configuration of an exchange device for gaming chips and cash currency in a third embodiment of the invention.

FIG. 6 shows exchange device 301 of a third embodiment of the present invention for exchanging the gaming chip G and the cash currency C.

The exchange device 301 is provided with an insertion opening 11 for inserting a gaming chip G into the exchange device 301 and a cash currency insertion opening 211 for inserting cash currency C into the exchange device 301.

The exchange device 301 has a display 31, and the display 31 includes the exchange start button 31*a*, the exchange execution button 31*b*, and the exchange cancellation button 31*c*. The exchange start button 31*a*, the exchange execution button 31*b*, and the exchange cancellation button 31*c* do not necessarily have to be displayed on the display 31 and may be provided separately from the display 31.

The gaming chip G inserted through the insertion opening 11 is exchanged for the cash currency C in the same procedure as described in the first embodiment.

The cash currency C inserted through the cash currency insertion opening 211 is exchanged for the gaming chip G in the same procedure as in the second embodiment.

The insertion opening 11 and the cash currency insertion opening 211 may be a single shared insertion opening (not shown) that allows both the insertion of the gaming chip and the cash currency C.

The inserted amount display section 32, which displays the amount of the inserted gaming chips G, and the inserted amount display section 232, which displays the amount of the inserted cash currency C, may be a single shared inserted amount display section (not shown) that displays both the amount of the inserted gaming chips G and the amount of the inserted cash currency C.

The gaming chip storage section 14, which is provided in the exchange device 301 and stores the inserted gaming chips G when the exchange from the gaming chip G to the cash currency C and the gaming chip storage section 214, which stores the gaming chip G for payout when exchanging from the cash currency C to the gaming chip G may be a single shared gaming chip storage section (not shown) that can both accept and dispense gaming chips G.

The gaming chip storage section 15, which is provided in the exchange device 301 and stores the cash currency C for payout when exchanging from the gaming chip G to the cash currency C and the cash currency storage section 214, which stores the inserted cash currency C when exchanging from the cash currency C to the gaming chip G may be a single shared cash currency storage section (not shown) that are capable of both accepting and paying out the cash currency C.

The determining section 21, which determines whether or not there is an abnormality in the gaming chip G at the time of inserting the gaming chip G, and the determining section 2212, which determines whether or not there is an abnormality in the gaming chip G at the time of taking out the gaming chip G may be a single shared decision section (not shown) that determines whether or not there is an abnormality in the gaming chip G at both the time of inserting and taking out the gaming chip G.

The exchange device 301 performs user recognition in the same manner as in the first embodiment and the second embodiment when exchanging from the gaming chip G to the cash currency C and from the cash currency C to the gaming chip G. The camera 42, the user ID information input section 42, the user recognition section 22, the user management section 23, and the database D used for user recognition are the same for both the exchange from the gaming chip G to the cash currency C and the exchange from the cash currency C to the gaming chip G.

If the user recognition section 22 fails to recognize the user or recognizes the user as a user who is on the so-called blacklist or restricted to the use of the exchange device 301, the function of the exchange device 301 may be stopped or the insertion of the gaming chip G and cash currency C may be made impossible, and the display 31 or the alarm may notify the user that the exchange device 301 is not allowed to be used.

DESCRIPTION OF THE REFERENCE NUMERALS

G Gaming Chips
C Cash currency
P Person wishing exchange
D Database
O External database
M Mark
1 Exchange device
11 Insertion opening
12 Gaming chip holding section
131 Wireless tag
132 Appearance inspection section
133 Chip counter
14 Gaming chip storage section
15 Cash currency storage section
16 Cash currency dispensing section
161 Cash currency counter
2 Control section
21 Determining section
22 User recognition section
23 User management section
31 Display
31a Exchange start button
31b Exchange execution button
31c Exchange cancellation button
32 Inserted amount display section
41 Camera
42 User ID information input section

The invention claimed is:

1. An exchange device for a gaming chip and cash currency, wherein the gaming chip has a color or an indication on the outer surface that represents a value, the exchange device comprising:
a cash currency insertion opening;
a cash currency reading section configured to acquire authenticity information and currency information of the cash currency inserted from the cash currency insertion opening;
an inserted cash currency amount display section configured to display an amount of the cash currency acquired by the cash currency reading section;
a gaming chip storage section configured to store the gaming chip by type;
a gaming chip dispensing section configured to dispense the gaming chip corresponding to the amount of cash currency acquired by the cash currency reading section from the gaming chip storage section; and
a take-out section on which the dispensed gaming chip is placed.

2. The exchange device for the gaming chip and cash currency of claim 1, further comprising a user recognition section configured to recognize a person.

3. The exchange device for the gaming chip and cash currency of claim 2, wherein the user recognition section has a function to capture an image of the person using a camera at a time of the person executing an exchange and to extract and identify an image of the face of the person from the image captured by the camera.

4. The exchange device for the gaming chip and cash currency of claim 2, further comprising a user ID information input section configured to input ID information of the person, wherein the user recognition section has a function to identify the person from the information on the person obtained by the user ID information input section.

5. The exchange device for the gaming chip and cash currency of claim 4, wherein the user ID information input section is further configured to obtain the information on the person by means of a member's card.

6. The exchange device for the gaming chip and cash currency of claim 2, further comprising a user management section, wherein the user management section is configured to store, in a database, information on a number of times or an amount of cash currency exchanged during a predetermined period of time for a specific user recognized by the user ID recognition section.

7. The exchange device for the gaming chip and cash currency of claim 6, wherein the user management section is further configured to grant points or status to the user under a predetermined condition and output the same.

8. The exchange device for the gaming chip and cash currency of claim 6, wherein the user management section is further configured to allow a predetermined exchange ratio to be set for each user under a predetermined condition.

9. The exchange device for the gaming chip and cash currency of claim 1, further comprising:
a cash currency storage section configured to store the cash currency by type; and
a cash currency holding section configured to temporarily hold the cash currency inserted from the insertion opening,
wherein the cash currency holding section has a function to move the inserted cash currency into the cash currency storage section by type when the exchange is executed.

10. The exchange device for the gaming chip and cash currency of claim 1, wherein the gaming chip dispensing section has a function to pay out the gaming chips individually or in batches.

11. The exchange device for the gaming chip and cash currency of claim 1, wherein the gaming chip has an embedded wireless tag storing chip information, the exchange device further comprising:
- a wireless tag reading section configured to read the wireless tag of the gaming chip placed on the take-out section to obtain the chip information of the gaming chip;
- a determining section configured to determine whether or not there is an abnormality in the chip information of the gaming chip obtained from the wireless tag reading section; and
- a control section configured to enable the gaming chip at the take-out section to be taken out when the determining section determines that there is no abnormality.

12. The exchange device for the gaming chip and cash currency of claim 11, wherein the take-out section is further provided with an openable door, and the openable door is closed while the determining section is determining, and the openable door is opened when the determining section determines that there is no abnormality.

13. The exchange device for the gaming chip and cash currency of claim 1, further comprising an appearance inspection section which inspects an appearance of the gaming chip placed on the take-out section.

14. The exchange device for the gaming chip and cash currency of claim 11, further comprising:
- an appearance inspection section which inspects an appearance of the gaming chip placed on the take-out section,
- wherein the appearance inspection section is configured to optically ascertain a number or a value of the gaming chip placed on the take-out section, and
- wherein the determining section is configured to:
  - compare the chip information of the gaming chip obtained from the wireless tag reading section and the number or the value of the gaming chip obtained from the appearance inspection section, and
  - determine, based on the chip information matching the number or the value, that the gaming chip placed in the take-out section is free of defects.

15. The exchange device for the gaming chip and cash currency of claim 14, wherein the gaming chip has a multi-layered structure in which a plurality of plastic layers of different colors are stacked, with a colored layer at least in the middle, and a white layer or a light colored layer on both sides of the colored layer in the middle to form a striped pattern on the sides in the direction of stacking, so that the type of gaming chip can be identified by the colored layer, and wherein the appearance inspection section is configured to ascertain the number or value of the gaming chip by the colored layer.

16. A device for exchanging gaming chips for cash currency, wherein each gaming chip incorporates a wireless tag storing currency information and has a color or indication of value on the outside surface, the device comprising:
- an insertion opening through which the gaming chip can pass;
- a wireless tag reading section configured to read the wireless tag of the gaming chip inserted through the insertion opening and obtain the currency information on the gaming chip;
- a determining section configured to determine whether or not the currency information of the gaming chip obtained from the wireless tag reading section is abnormal;
- an inserted amount display section configured to display the amount of the gaming chip based on the determining section determining the gaming chip to be free of abnormalities;
- a cash currency storage section configured to store the cash currency by type; and
- a cash currency dispensing section configured to dispense cash currency from the cash currency storage section corresponding to the amount of the gaming chips that the determining section determines to be free of abnormalities.

17. The device for exchanging the gaming chips for cash currency of claim 16, further comprising a user recognition section configured to recognize a person.

18. The device for exchanging the gaming chips for cash currency of claim 17, wherein the user recognition section has a function to capture an image of the person using a camera at a time of the person executing an exchange and to extract and identify an image of the face of the person from the image captured by the camera.

19. The device for exchanging the gaming chips for cash currency of claim 17, further comprising:
- a user ID information input section to which ID information of the person is input,
- wherein the user recognition section has a function to identify the person from the information on the person obtained by the user ID information input section.

20. The device for exchanging the gaming chips for cash currency of claim 19, wherein the user ID information input section is configured to obtain the information on the person wishing exchange by means of a member's card.

21. The device for exchanging the gaming chips for cash currency of claim 17, further comprising a user management section, wherein the user management section is configured to store, in a database, information on a number of times or an amount of cash currency to be exchanged during a predetermined period of time for a specific user recognized by the user ID recognition section.

22. The device for exchanging the gaming chips for cash currency of claim 21, wherein the user management section is further configured to grant points or status to a user under a predetermined condition and output the same.

23. The device for exchanging the gaming chips for cash currency of claim 21, wherein the user management section is further configured to allow a predetermined exchange ratio to be set for each user under a predetermined condition.

24. The device for exchanging the gaming chips for cash currency of claim 16, further comprising:
- a gaming chip storage section configured to store the gaming chips by type; and
- a gaming chip holding section configured to temporarily hold the gaming chip inserted through the insertion opening,
- wherein the gaming chip holding section has a function to move the inserted gaming chips to the gaming chip storage section by type when executing the exchange.

25. The device for exchanging the gaming chips for cash currency of claim 16, further comprising an appearance inspection section configured to inspect an appearance of the gaming chip inserted through the insertion opening.

26. The device for exchanging the gaming chips for cash currency of claim 25, wherein the appearance inspection section has a function to optically ascertain a number or a value of the gaming chip inserted through the insertion opening, and wherein the determining section is configured to:

compare the chip information of the gaming chip obtained from the wireless tag reading section and the number or the value of the gaming chip obtained from the appearance inspection section, and determine, based on the chip information matching the number or the value, that the gaming chip is free of abnormalities.

27. The device for exchanging the gaming chips for cash currency of claim 26, wherein each gaming chip has a multi-layered structure in which a plurality of plastic layers of different colors are stacked, with a colored layer at least in the middle, and a white layer or a light colored layer on both sides of the colored layer in the middle to form a striped pattern on the sides in the direction of stacking, so that the type of gaming chip can be identified by the colored layer, and wherein the appearance inspection section is configured to ascertain the number or the value of the gaming chip by the colored layer.

28. An exchange device for gaming chips and cash currency, wherein each gaming chip incorporates a wireless tag storing currency information and has a color or an indication of a value on an outside surface of the gaming chip, the exchange device comprising:

an insertion opening through which the cash currency or the gaming chip can pass;

a cash currency reading section configured to acquire authenticity information and currency information of the cash currency inserted from the insertion opening;

a wireless tag reading section configured to read the wireless tag of the gaming chip inserted through the insertion opening and obtain currency information of the gaming chip;

a determining section configured to determine whether or not the currency information of the gaming chip obtained from the wireless tag reading section is abnormal;

an inserted amount display section configured to display an amount of cash currency obtained by the cash currency reading section or an amount of the gaming chips determined by the determining section to be free of abnormalities;

a gaming chip storage section configured to store the gaming chips by type;

a cash currency storage section configured to store the cash currency by type;

a gaming chip dispensing section configured to dispense the gaming chips corresponding to the amount of cash currency acquired by the cash currency reading section from the gaming chip storage section;

a take-out section on which the dispensed gaming chips are placed; and a cash currency dispensing section configured to dispense the cash currency from the cash currency storage section corresponding to the amount of gaming chips that the determining section determines to be free of abnormalities.

* * * * *